US007357167B2

(12) United States Patent
Mitsui et al.

(10) Patent No.: US 7,357,167 B2
(45) Date of Patent: Apr. 15, 2008

(54) TRANSFER DEVICE

(75) Inventors: Takashi Mitsui, Osaka (JP); Hideto Shima, Kyoto (JP)

(73) Assignee: Kokuyo Co., Ltd. (JP)

( * ) Notice: Subject to any disclaimer, the term of this patent is extended or adjusted under 35 U.S.C. 154(b) by 490 days.

(21) Appl. No.: 11/012,254

(22) Filed: Dec. 16, 2004

(65) Prior Publication Data

US 2005/0155717 A1 Jul. 21, 2005

(30) Foreign Application Priority Data

Jan. 19, 2004 (JP) ............................ 2004-010144

(51) Int. Cl.
*B32B 37/22* (2006.01)

(52) U.S. Cl. ...................... 156/523; 156/577; 156/579; 118/76; 118/200; 118/257; 242/588; 242/588.2; 242/588.3; 242/588.6; 242/160.2; 242/160.4; 242/170; 242/171; 206/411

(58) Field of Classification Search ................ 156/523, 156/527, 538, 540, 574, 577, 579; 118/76, 118/200, 257; 225/46; 242/160.2, 160.4, 242/170, 171, 588, 588.2, 588.3, 588.6; 206/411
See application file for complete search history.

(56) References Cited

U.S. PATENT DOCUMENTS 5,150,851 A 9/1992 Manusch et al.
5,632,684 A 5/1997 Kumar et al.
6,079,660 A 6/2000 Manusch et al.
6,620,239 B2 * 9/2003 Yen ............................ 118/76
6,745,808 B2 * 6/2004 Kobayashi ................. 156/577

FOREIGN PATENT DOCUMENTS

| | | |
|---|---|---|
| EP | 1285874 | 2/2003 |
| JP | 2532967 | 1/1997 |

* cited by examiner

*Primary Examiner*—Mark A Osele
(74) *Attorney, Agent, or Firm*—Banner & Witcoff, Ltd.

(57) ABSTRACT

A transfer device A that is used for transferring a transferring paste T on an object on which the transferring paste T is to be transferred comprises a pair of first outside panel 21 and the second outside panel 11 that hold the transferring paste T, a pair of spools SP1, SP2 that are supported rotatably by a pair of the first and second outside panels 21, 11 and that hold the transferring paste T, and a pair of gears G1, G2 that drive a pair of the spools SP1, SP2 to rotate and that gear each other, and rotational supporting axes 211, 212 that project toward the second outside panel 11 and that axially support the gears G1, G2 are arranged on the first outside panel 21, wherein a restraining means R that restrains the gear G1 from being pulled out along an axial direction of the rotational supporting axis 211 in a state that the gears G1, G2 are axially mounted on the rotational supporting axes 211, 212 is arranged between the first outside panel 21 and the gear G1 and at a portion different from a portion where the gear G1 is axially mounted on the rotational supporting axis 211.

21 Claims, 10 Drawing Sheets

(a)

(b)

TRANSFER DEVICE

BACKGROUND OF THE INVENTION AND RELATED ART STATEMENT

This invention relates to a transfer device that is used for transferring a transferring material on an object on which the transferring material is to be transferred.

Various transfer devices have been conceived that are used in case of transferring a transferring material on an object on which the transferring material is to be transferred. These transfer devices are so arranged that a pair of gears are rotatably mounted on a rotational supporting axis arranged on a pair of side panels wherein the gears drive a pair of spools to rotate and gear each other in conjunction with a pair of the spools that are rotatably supported by the side panels holding the transferring material and that mount the transferring material. As an arrangement to mount these gears on the rotational supporting axis, it is represented that multiple slits are arranged along an axial direction of the supporting axis, an engaging nail is arranged at a distal end portion of a portion that is surrounded by the slit, the portion surrounded by the slit bends toward a direction so that both ends of the portion approach each other in conjunction with an operation to push a cylindrical body that is arranged on the gear and that can fit over the rotational supporting axis from the distal end portion of the rotational supporting axis, and when the cylindrical body climbs over the engaging nail, the portion surrounded by the slit elastically restores to the original shape and the engaging nail engages with the cylindrical body and the rotational supporting axis fits over the cylindrical body so as to restrain the gear from being pulled out along the axial direction of the rotational supporting axis. (For example, refer to patent document 1.)

(Patent document 1) Japan utility model official gazette number 2532967 (Page 1~page 3, FIG. 2, FIG. 3)

However, since conventional transfer devices have an arrangement wherein the gear and the rotational supporting axis are mutually engaged by making use of the engaging nail arranged on the rotational supporting axis, rotational blurring tends to be generated at a position separated from the position where the gear is axially mounted to the rotational supporting axis, especially at an outer edge of the gear, which aggravates usability. Especially when a clearance between the rotational supporting axis and the gear (the cylindrical portion) is set to be a little large in order to make an operation of fitting the gear (the cylindrical portion) over the rotational supporting axis smooth, the above-mentioned problem is easily generated. In addition, an arrangement wherein a rib or a projecting portion is arranged between the side panel on which the rotational supporting axis is arranged and the gear and a center portion of the gear and/or near the outer edge portion of the gear in a state that the gear is axially mounted on the rotational supporting axis can be conceived. However, in accordance with this arrangement, the number of components is increased and the manufacturing process is complicated, which is not preferable in view of cost.

In order to solve the above-mentioned problems, a main object of the present claimed invention is to provide a transfer device to prevent the gear from being pulled out of the side panel and to prevent the gear from rotational blurring that tends to be generated at a portion separated from the rotational center portion of the gear.

SUMMARY OF THE INVENTION

The transfer device of the present claimed invention is used for transferring a transferring material on an object on which the transferring material is to be transferred, and comprises a pair of side panels that hold the transferring material, a pair of spools that are supported rotatably by a pair of the side panels and that hold the transferring material, and a pair of gears that drive a pair of the spools to rotate and that gear each other, wherein a rotational supporting axis that projects toward the other side panel and that axially supports the gear is arranged on either one of the side panels, and is characterized by that a restraining means that restrains the gear from being pulled out along an axial direction of the rotational supporting axis in a state that the gear is axially supported by the rotational supporting axis is arranged between one of the side panels or the rotational supporting axis and the gear and furthermore at a portion different from a portion where the gear and the rotational supporting axis are axially mounted.

In accordance with this arrangement, the restraining means can prevent the gear from being pulled out from the side panels and since the restraining means is arranged at a portion where the gear is axially mounted on the rotational supporting axis, namely, a portion different from the rotational center of the gear, it is possible to prevent the gear from rotational blurring that tends to be generated at a portion separated from the rotational center portion. Since a clearance between the rotational supporting axis and the gear can be set extremely small depending on a setting, a problem caused by a conventional arrangement, namely rotational blurring of the gear, can be effectively solved. The rotational blurring is caused by a somewhat big clearance between the rotational supporting axis and the gear in order to make an operation of engaging the gear and the rotational supporting axis by fittingly inserting the engaging nail arranged on the rotational supporting axis into the gear easy. In addition, this arrangement makes it possible to simplify arrangement of the rotational supporting axis and the gear compared with the conventional engaged arrangement by making use of the engaging nail. This arrangement makes it possible to improve a sliding state between the rotational supporting axis and the gear because no component such as an engaging nail exists. "A pair of side panels that hold the transferring material" includes both states; one of which is a state that the transferring material is directly held by a pair of the side panels (so called a transfer device of a dispensable cartridge type), the other of which is a state that the transferring material is indirectly held by a pair of the side panels (a transfer device of a refillable cartridge type).

In addition, if the restraining means can position the gear at a predetermined mounting position by mutually engaging a portion locating at an outer edge side from a center between a center portion of the gear and the outer edge of the gear and the side panel or the rotational supporting axis, it is possible to stabilize an axially mounted state of the gear and the side panel or the rotational supporting axis and it is also possible to certainly prevent the rotational blurring that tends to be generated at the outside edge portion of the gear. Especially, the axially mounted state can be stabilized most in case that a portion of the gear near the outer edge engages with the side panel or the rotational supporting axis.

In order to make the restraining means with a simple arrangement, it is preferable that the restraining means comprises a general toric concave portion that is formed on the gear and that has a predetermined opening width, and an engaging portion that is formed on the side panel or the rotational supporting axis and that is inserted into the concave portion and engages with the gear in a range that does not disturb a rotational movement of the gear.

Especially, if a step portion that projects toward a direction where the opening width of the concave portion is narrowed is arranged inside the concave portion and an engaging nail that can make an engagement with the step portion is arranged on the engaging portion, an engaged state of the concave portion and the engaging portion can be improved by engaging the engaging nail with the step portion.

Furthermore, if the step portion is arranged generally in an arc shape along an inner circumferential face or an outer circumferential face of the concave portion, a cutout is formed at a part of the step portion, and the engaging nail is inserted into the concave portion through the cutout and engages with the step portion, it is possible to make an operation to engage the engaging nail with the step portion smooth.

If an arm portion that connects a portion located inside of the concave portion and a portion located outside of the concave portion is arranged on the gear, it is possible to avoid the gear from being separated into two members by the concave portion and the arm portion functions as a rib to reinforce the concave portion or an area surrounding the concave portion. "A portion located inside of the concave portion" means an area inside of the inner circumferential face of the concave portion of the gear and "a portion located outside of the concave portion" means an area outside of the outer circumferential face of the concave portion of the gear.

In order to form the concave portion with ease it is preferable that the concave portion is a slit formed to penetrate the gear along a direction of a wall thickness of the gear.

As another arrangement of the restraining means it is represented that the restraining means comprises an engaging portion that is arranged on the side panel or the rotational supporting axis and that makes an engagement with one part of the gear in a range that does not disturb a rotational movement of the gear. In accordance with this arrangement, since there is no need of forming a concave portion on the gear, it is possible to simplify the arrangement compared with the restraining means of the above-mentioned arrangement. In this case, it is preferable that an engaging nail that can make an engagement with a portion of the gear facing the other side panel on which the gear is not mounted is arranged on the engaging portion. "A portion of the gear facing the other side panel" means a portion directly of indirectly facing an inside face of the other side panel.

In order to further stabilize the engaged state of the restraining means, it is preferable that multiple engaging portions are arranged on the side panel or the rotational supporting axis.

In addition, if the restraining means is arranged only between one of a pair of the gears and the side panel or the rotational supporting axis and a part of the other gear is positioned between the gear and the side panel, the restraining means is required to arrange to relate with only one of the gears, which makes it possible to reduce the number of components and to simplify the manufacturing process compared with a case wherein the restraining member is arranged to relate with both of the gears and also possible to prevent the other gear from being pulled out by arranging the other gear between one of the gears mutually engaged by the restraining member and the side panel.

As a concrete embodiment of this case it is preferable that the other gear has a gear body that gears with the gear, and a big diameter portion whose diameter is set to be larger than a diameter of the gear body, and the big diameter portion is arranged between the gear and the side panel. In addition, if the gear body and the big diameter portion are integrally formed, it is possible to reduce the number of components and to effectively increase intensity of the big diameter portion.

Furthermore, if a cylindrical portion that rotates together with the gear, that fits over the rotational supporting axis rotatably, and that engages with the spool is arranged at a portion where the gear is axially mounted on the rotational supporting axis, it is possible to increase intensity of the portion where the gear is axially mounted on the rotational supporting axis by fittingly inserting the rotational supporting axis into the cylindrical portion. It is also possible to make a rotational movement of the gear and the spool surely in a related condition because the cylindrical portion and the spools are mutually engaged. In this case, if the cylindrical portion is integrally formed with the gear, the number of components can be reduced.

In addition, if the transfer device comprises a refillable cartridge that holds at least the transferring material and the spool, and a case that accommodates the refillable cartridge detachably, wherein the side panel on which the gear is axially mounted through the rotational supporting axis is a component constituting the case, the gear will not be dropped off from the case even though the case is flipped vertically and horizontally in case of exchanging the refillable cartridge, thereby to improve usability.

BRIEF DESCRIPTION OF THE DRAWINGS

FIG. 4(*b*) is a side view of the transfer head of FIG. 4(*a*) viewed from a direction of an arrow M.

FIG. 4(*c*) is a bottom view of the transfer head of FIG. 4(*a*).

FIG. 5 (*b*) is a side view viewed from a direction of an arrow N in FIG. 5(*a*), and FIG. 5(*c*) is a cross-sectional view taken along a line A-A in FIG. 5(*b*).)

FIG. 9(*b*) is another explanatory view of an operation of one embodiment of the present invention.

FIG. 10(*b*) is another view showing a modified form of a restraining means in accordance with one embodiment of the invention.

FIG. 10(*c*) is another view showing a modified form of a restraining means in accordance with one embodiment of the invention.

DETAILED DESCRIPTION OF THE PREFERRED EMBODIMENTS

An embodiment of the present claimed invention will be described in detail with reference to the accompanying drawings.

Figure 1:
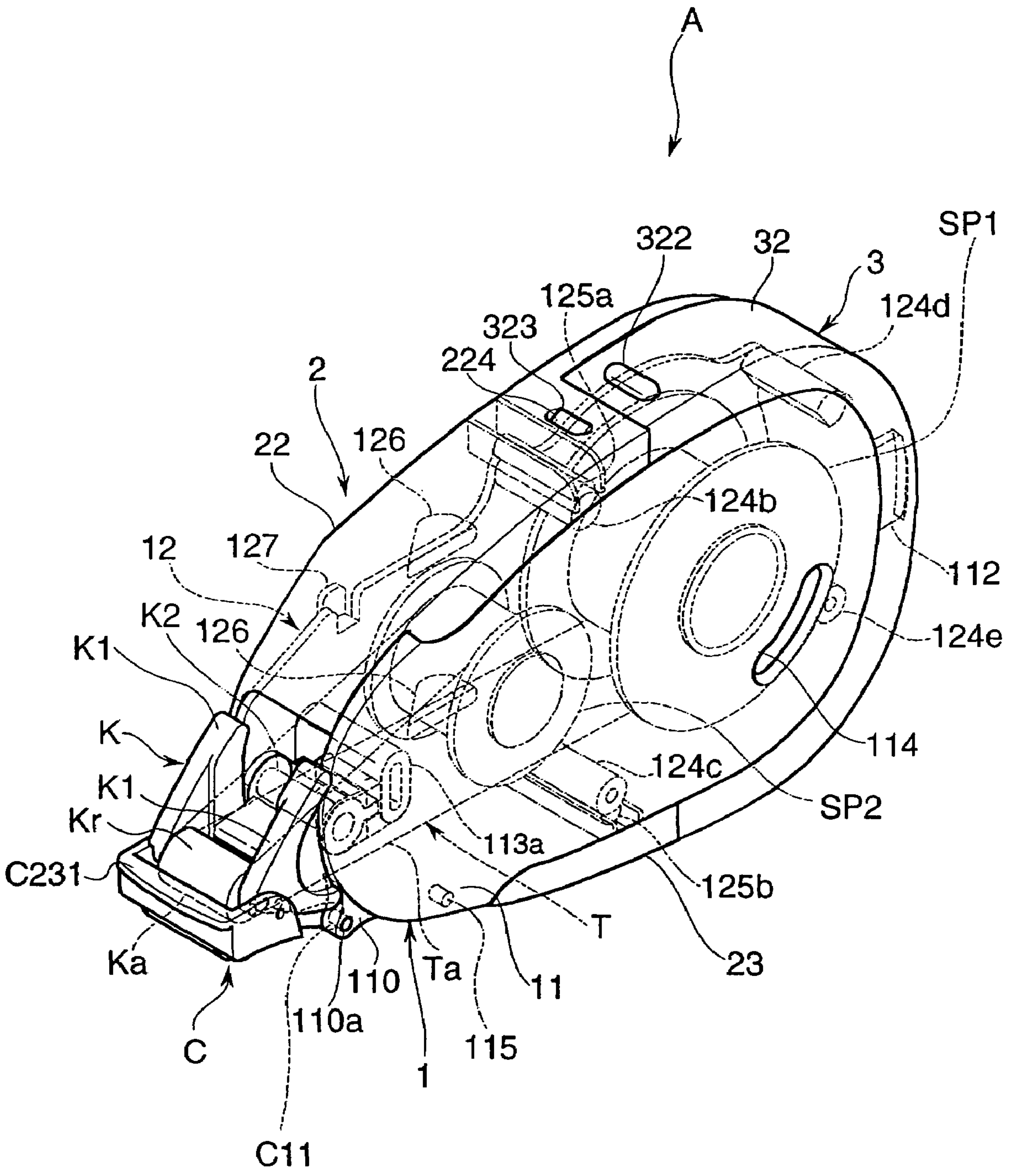
FIG. 1 is a general perspective view showing a transfer device in accordance with one embodiment of the present claimed invention.
Figure 2:
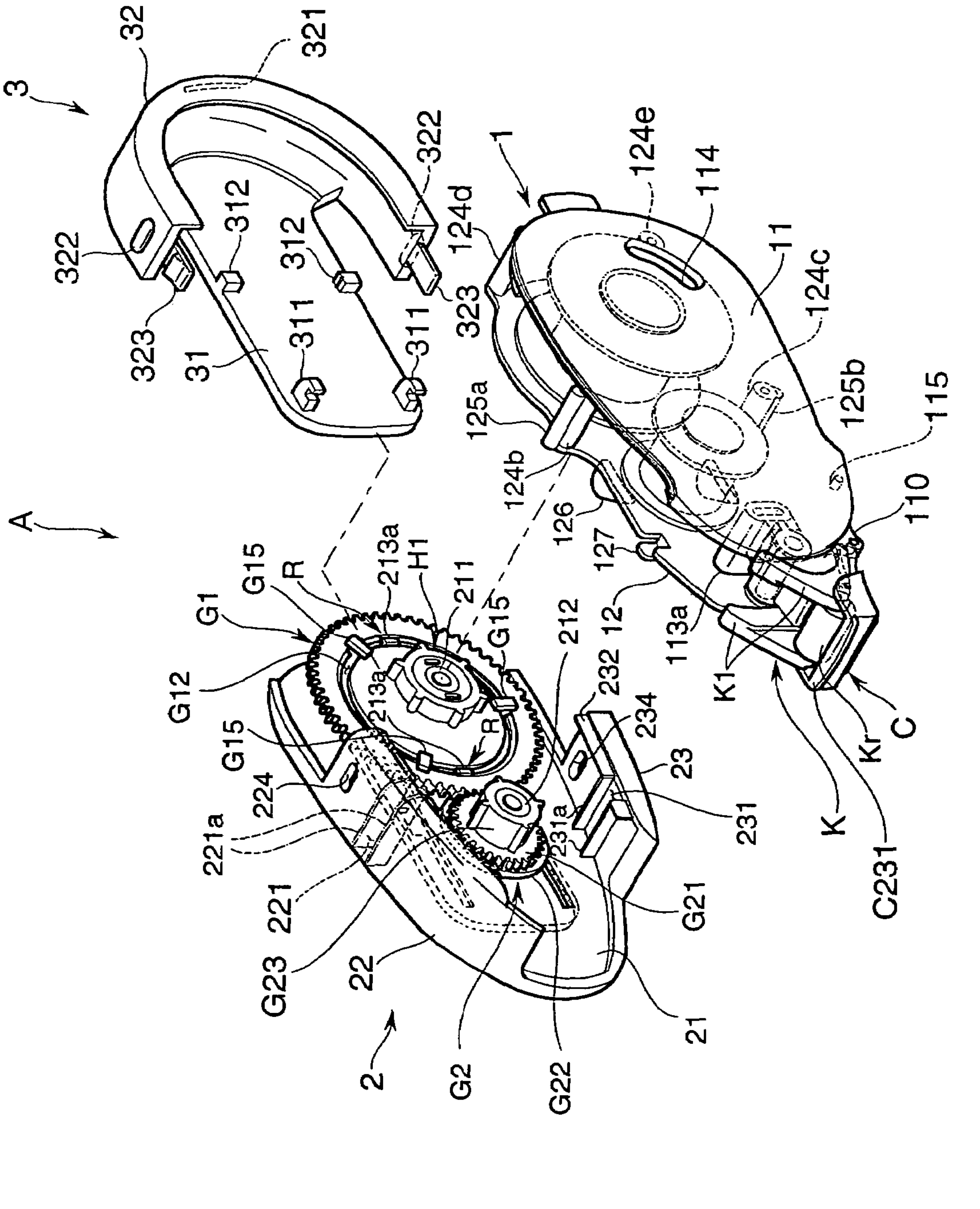
FIG. 2 is an exploded perspective view of the transfer device in accordance with the embodiment.

A transfer device A in accordance with this embodiment accommodates, as shown in FIG. 1 as FIG. 2, a tape body Ta and a transferring paste T as being a transferring material that is adhered to a single face of the tape body Ta in a predetermined pattern and is used for transferring the transferring paste T on an object on which the transferring paste T is to be transferred such as papers or leaves, not shown in drawings.

The transfer device A in accordance with the embodiment mainly comprises a refillable cartridge 1 that holds the transferring paste T, and a case 2 that accommodates the refillable cartridge 1 detachably, wherein a sliding member 3 that can make a sliding movement relative to the case 2 is mounted on the case 2. In the following explanation, a term "front" showing a position or a direction indicates a side where a transfer head K is located, and a term "back" indicates an opposite side to the position where the transfer head K is located. In addition, "a direction along back and forth" indicates a longitudinal direction of the transfer device A.

Figure 3:
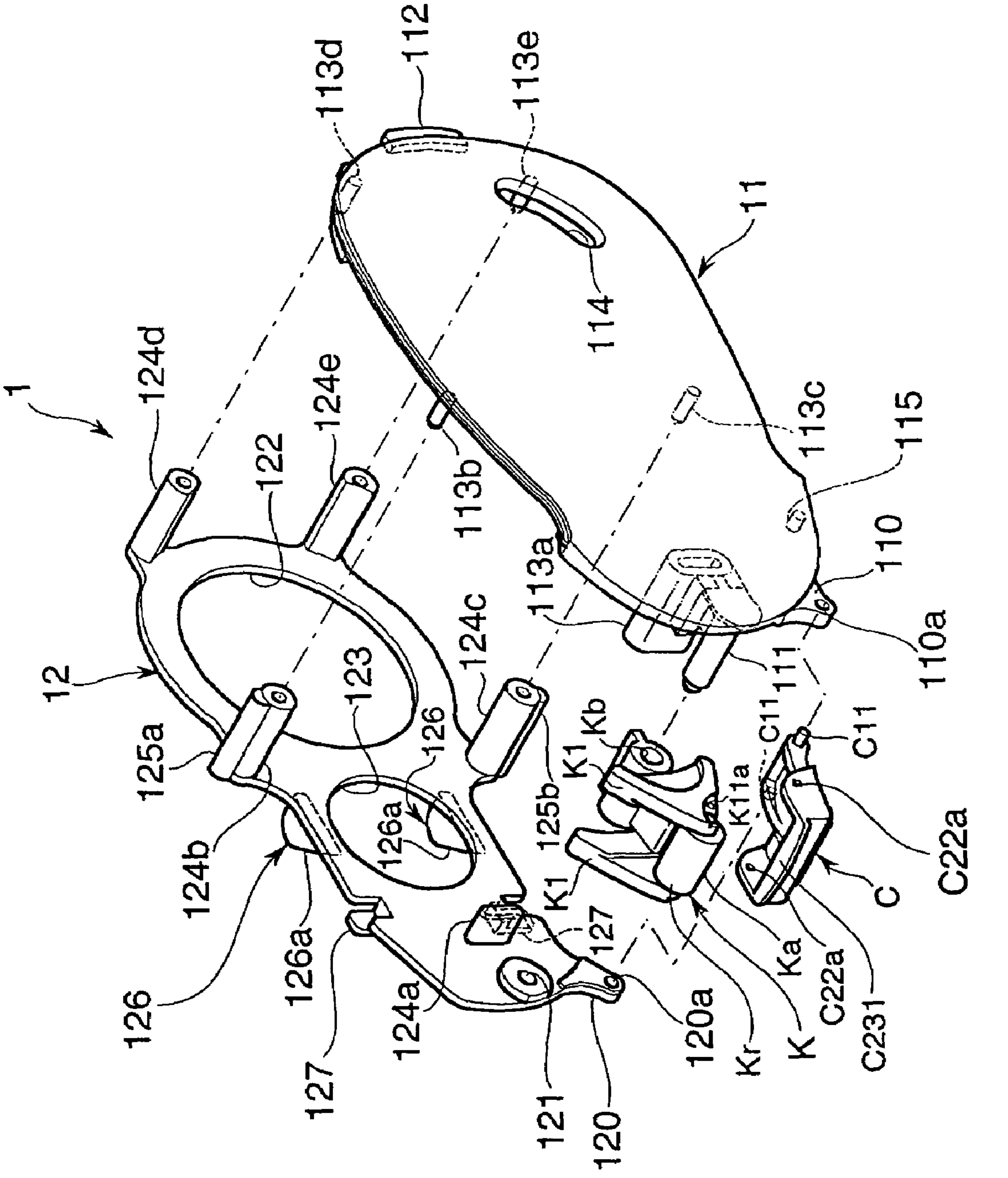
FIG. 3 is an exploded perspective view showing a refillable cartridge in accordance with the embodiment wherein a spool is omitted to draw.

The refillable cartridge 1 comprises mainly, as shown in FIG. 1 through FIG. 3, a second outside panel 11 as being one of outer walls of the transfer device A, and an inside panel 12 arranged to face the second outer panel 11. The refillable cartridge 1 holds the transferring paste T mounted on a wind-off spool SP1 and a roll-up spool SP2 as being "a pair of spools" in the present claimed invention, the transfer head K that makes the transferring paste T contact with a surface of papers or leaves, and a head cap C that can be rotatable between a transfer head covering position where a distal end portion Ka of the transfer head K can be covered and a transfer head exposing position where the distal end portion Ka of the transfer head K can be exposed between the second outside panel 11 and the inside panel 12. (Refer to FIG. 2; the wind-off spool SP1 and the roll-up spool SP2 are omitted to show in FIG. 2). The second outside panel 11 corresponds to "the other side panel" among a pair of the side panels in the present claimed invention. FIG. 1 shows the transfer device A in a state that the head cap C is located at the transfer head covering position.

The second outside panel 11 is, for example, in a shape of a thin plate made of synthetic resin and in this embodiment, is in a general egg-shape in a side view as shown in FIG. 3. A thin plate-shaped elongated portion 110 that extends downward at an angle is arranged at a front end portion of the second outside panel 11 and a through bore 110*a* into which a rotational supporting axis C11 of the head cap C can be inserted is formed at a general center portion of the elongated portion 110. A supporting shaft 111 that can support the transfer head K is formed to project toward a direction of the inside panel 12 at a front end portion of the inside face of the second outside panel 11. A bore portion Kb into which the supporting shaft 111 is inserted is formed on the transfer head K. Furthermore, a fitting nail 112 is arranged to project rearward at a rear end portion of the second outside panel 11 and the fitting nail 112 is so set to fit into a fitting bore 321, to be described later, formed on the sliding member 3 when the transfer device A is in use (when the sliding member 3 is located at a position where a sliding movement starts). In addition, a convex portion 115 is integrally formed to project toward the inside panel 12 at a lower end portion of the front end portion on an inner face of the second outside panel 11. The convex portion 115 is a small projection in a general column shape and is so set to fit into a concave portion C12*a*, to be described later, of the head cap C in case that the head cap C is located at the transfer head exposing portion. In addition, supporting concave portions, not shown in drawings, each of which rotatably supports the wind-off spool SP1 and the roll-up spool SP2 whose one side end portion is rotatably supported by the inside panel 12, are formed at predetermined areas, which the other end side portion of the wind-off spool SP1 and the roll-up spool SP2 can make an abutting contact with or can be close to, in an inner face of the second outside panel 11.

The inside panel 12 is, for example, in a shape of a thin plate made of synthetic resin and in this embodiment, a rear end side of the inside panel 12 is a partial ark in a side view and a front end side of the inside panel 12 is a general square in a side view. Like the second outside panel 11, an elongated portion 120 that extends downward at an angle is arranged at a front end portion of the inside panel 12 and a through bore 120*a* into which the rotational supporting axis C11 of the head cap C can be inserted is formed at a general center portion of the elongated portion 120. In a state that the inside panel 12 and the second outside panel 11 are assembled, the elongated portion 120 faces the elongated portion 110. Then the head cap C can make a rotational movement around the rotational supporting axis C11 by inserting the rotational supporting axis C11 into the through bore 110*a* of the elongated portion 110 and the through bore 120*a* of the elongate portion 120. A concrete explanation about the head cap C will be described later. A bore 121 is formed at a front end portion of the inside face of the inside panel 12 to accept a distal end portion of the supporting shaft 111 formed on the second outside panel 11. In addition, supporting bores 122, 123 that can support each of the wind-off spool SP1 and the roll-up spool SP2 in a rotatable manner are formed to open at a rear end portion side and a center portion of the inside panel 12 respectively. A diameter of the supporting bore 122 for the wind-off spool SP1 is made to be larger than a diameter of the supporting bore 123 for the roll-up spool SP1 in order to correspond to each diameter of the wind-off spool SP1 and the roll-up spool SP2 respectively. Each of the wind-off spool SP1 and the roll-up spool SP2 is in a general cylindrical shape with a fringe integrally formed and supported between the inside panel 12 and the second outside panel 11 in a rotatable manner with each of one end portion thereof inserted into the supporting bores 122, 123 and each of the other end portion thereof inserted into the supporting concave.

The second outside panel 11 and the inside panel 12 are in a fitting arrangement, as shown in FIG. 3. In order to do so, a cylindrical portion 113*a* and small projections 113*b*, 113*c*, 113*d*, 113*e* are formed at an inside face of the second outside panel 11 to project toward the inside panel 12 and a small projection 124*a*, which can fit into the cylindrical portion 113*a*, and cylindrical portions 124*b*, 124*c*, 124*d*, 124*e*, each of which can fit over each of the small projections 113*b*, 113*c*, 113*d*, 113*e* respectively are formed at an inside face of the inside panel 12 to project toward the second outside panel 11. More concretely, the cylindrical portion 113*a* in a compressed shape is formed at the front end portion of the second outside panel 11, the small projections 113*b*, 113*c* are formed at vertical two positions of a general center along back and forth, and the small projections 113*d*, 113*e* are formed at a rear end portion with a predetermined distance kept vertically. Each of the small projections 113*b*, 113*c*, 113*d*, 113*e* is in a shape of a small column with a small projecting height. A projecting height of the convex portion 115 arranged on the inside face of the second outside panel 11 is set lower than the projecting height of the small projections 113*b*, 113*c*, 113*d*, 113*e*. The small projections 124*a* and the cylindrical portions 124*b*, 124*c*, 124*d*, 124*e* are arranged at predetermined positions on the inside panel 12 so as to correspond to each shape and each portion of the cylindrical portion 113*a* and the small projections 113*b*, 113*c*, 113*d*, 113*e*. The small projection 124*a* located at the front end portion is in a thin plate shape to correspond to a shape of the cylindrical portion 113*a* and each of the cylindrical portions 124*b*, 124*c*, 124*d*, 124*e* is in a general cylinder. In addition, projecting portions 125*a*, 125*b* are integrally arranged on an outer circumferential face of the cylindrical portions 124*b*, 124*c* arranged vertically at a general center along back and forth. Each of the projecting portions 125*a*, 125*b* is in a shape of a partial ark in a plane view wherein the projecting portion 125*a* projects upward from the outer circumferential face of the cylindrical portion 124*b* and the projecting portion 125*b* projects downward from the outer circumferential face of the cylindrical portion 124*c*.

Figure 4:
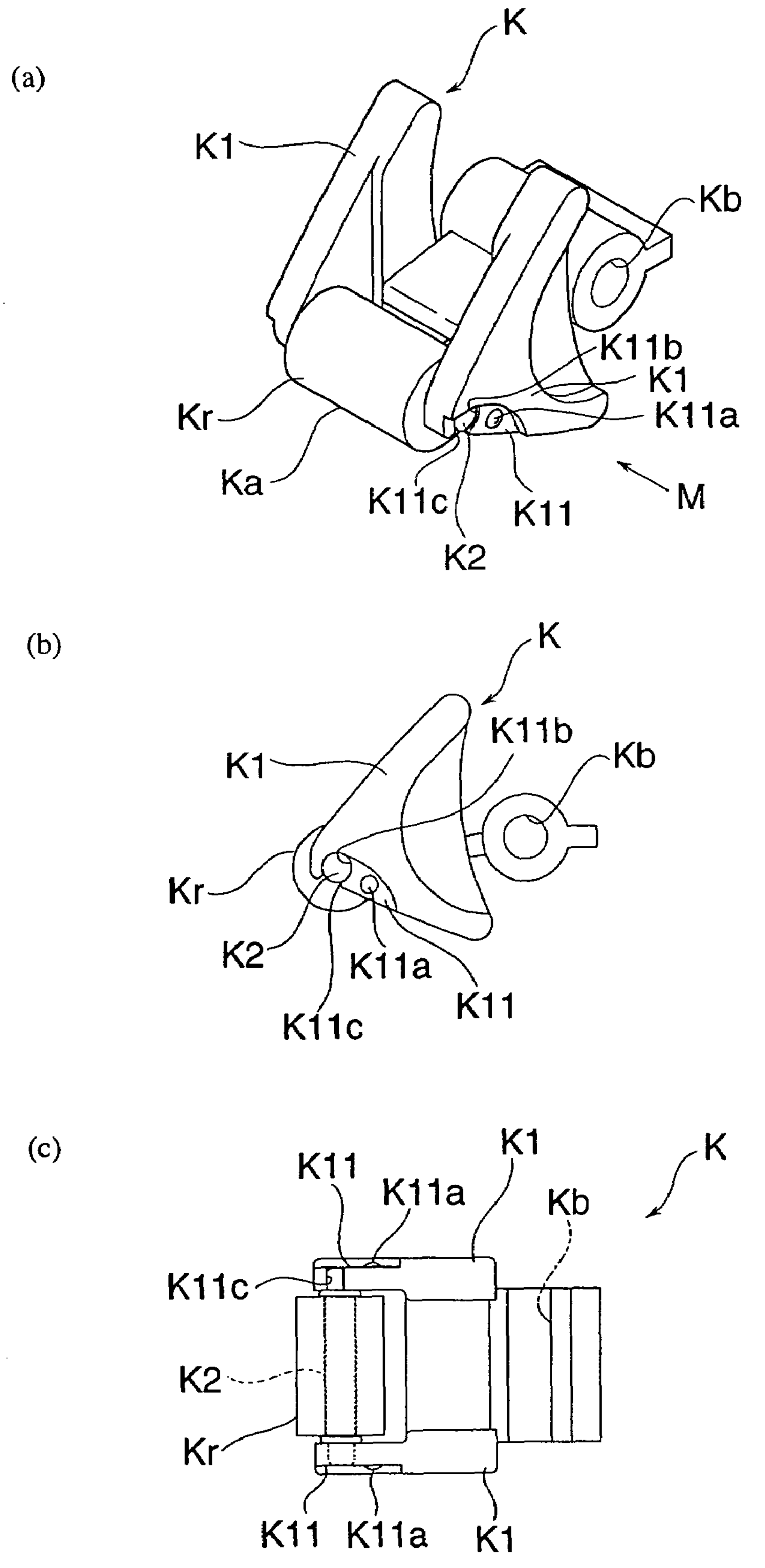
FIG. 4(*a*) is a perspective view showing a transfer head in accordance with the embodiment.

The transfer head K is so arranged that a roller Kr is held between a pair of facing panels K1 as shown in FIG. 4 (FIG. 4(*a*) shows a general perspective view, FIG. 4(*b*) shows a side view viewed from a direction of an arrow M, and FIG. 4(*c*) shows a bottom view.) More concretely, thin portions K11 are formed on each outer faces at a bottom portion of a pair of the facing panels K1 and through bores K11*b* are formed at a distal end portion of each thin portion K11. Both side portions of a rotational supporting axis K2 of the roller Kr are inserted into the through bores K11*b* respectively so that the roller Kr is rotatable around the rotational supporting axis K2. A cutout K11*c* is formed at a bottom edge of one of the through bores K11*b* to communicate with the through bore K11*b* so as to facilitate an operation of mounting the roller Kr and the rotational supporting axis K2. In other words, one side end portion of the rotational supporting axis K2 is inserted into other through bore K11*b* without a cutout K11*c*, and then other side end portion of the rotational supporting axis K2 is inserted into the former through bore K11*b* through the cutout K11*c*. In addition, a convex portion K11*a* is arranged on each thin portion K11 respectively to project outward. Each convex portion K11*a* is generally in a shape of a partial sphere and fits into a fitting bore C22 of the head cap C, to be described later, in case that the head cap C is located at the transfer head covering position. In this embodiment the distal end portion Ka indicates a distal end portion of the roller Kr held between the facing panels K1.

Figure 5:
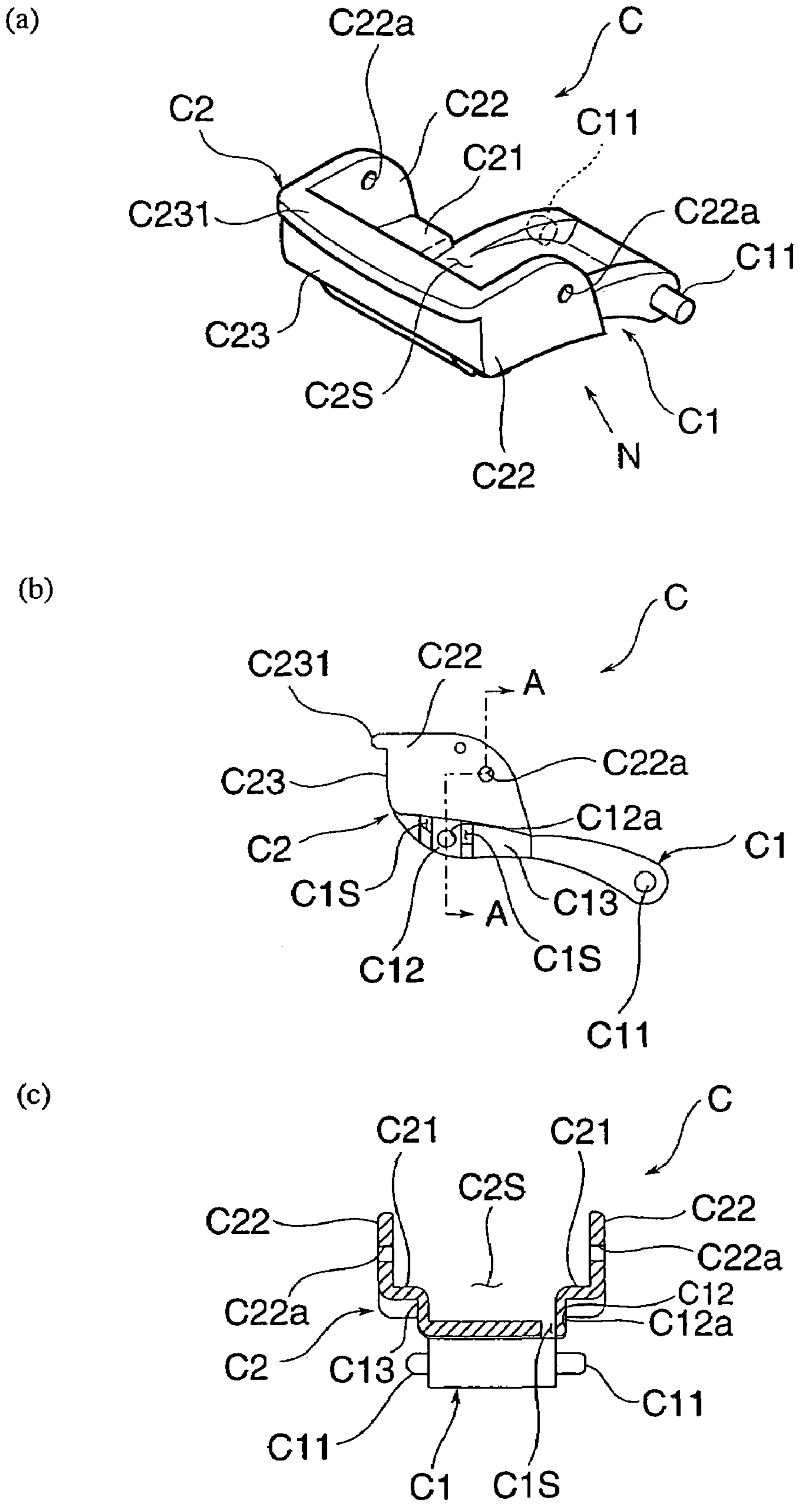
FIG. 5(*a*) is a perspective view showing a head cap in accordance with the embodiment.

The head cap C has rotational supporting axis C11 axially supported by through bores 110*a*, 120*a* formed on the elongating portions 110, 120 of the inside panel 12 at an area adjacent to its proximal end portion of the head cap C, as shown in FIG. 5 (FIG. 5(*a*) shows a general perspective view, FIG. 5(*b*) shows a side view viewed from a direction of an arrow N in FIG. 5(*a*), and FIG. 5(*c*) is a cross-sectional view taken along a line A-A in FIG. 5(*b*).) A term “proximal” or “rear” showing a position or a direction of the head cap C indicates a rear side of the transfer device A in case that the head cap C is located at the transfer head cap covering position, while a term “distal” or “front” indicates a front side of the transfer device A in case that the head cap C is located at the transfer head cap covering position. More concretely, the head cap C comprises an arm portion C1 that extends from the proximal end portion toward the front and an accommodating portion C2 that is integrally formed with a distal end portion of the arm portion C1 and that can accommodate the distal end portion Ka of the transfer head K at the transfer head cap covering position. The arm portion C1 is in a shape of a thin plate and in a shape extending toward a distal end portion and upward little by little with bending in a side view. The rotational supporting axis C11 are formed to project outward at both side end portions of a proximal end portion of the arm portion C1. The rotational supporting axis C11 is generally in a column shape with its diameter a little smaller than a diameter of the through bores 110*a*, 120*a* formed on the elongating portion 110 of the second outside panel 11 and the elongating portion 120 of the inside panel 12. In addition, standing members C13 are formed at both side edges from a general center along a longitudinal direction to the distal end portion of the arm portion C1 and an elastically transformable elastic portion C12 is formed at a part of one of the standing members C13. The elastic portion C12 has an arrangement of partially discontinuous to other portion of the standing member C13 due to a slit C1S formed continuously along-its back and forth and inward so as to be able to bend a little by a force applied from outside (refer to FIG. 5(*b*), FIG. 5(*c*)). A concave portion C12*a* as being a fitting concave portion of the present claimed invention is formed at a general center portion of the elastic portion C12 to be dented. The concave portion C12*a* is circular in a side view and fits over the convex portion 115 arranged on the second outside panel 11 of the refillable cartridge 1 in case that the head cap C is located at the transfer head exposing position. The accommodating portion C2 has a bottom panel C21 that extends from the upper end portion of the standing members C13 arranged at both side edge portions toward its side respectively in an area from a general center along a longitudinal direction to a distal end portion of the arm portion C1, a pair of facing panels C22 each of which stands at a side edge portion of the bottom panel C21 respectively and faces each other, and a front panel C23 that is arranged to connect each of front edge sides of the facing panels C22 so as to form an accommodating space C2S with opening upward and rearward. In addition, a fitting bore C22*a* as being a fitting concave portion of the present claimed invention is formed on an upper end portion of each facing panel C22 to penetrate thickness of the facing panels C22. The convex portion K11*a* arranged on facing panels K1 of the transfer head K fits in the fitting bore C22*a* in case that the head cap C is located at the transfer head covering position. An operating portion C231 is integrally arranged on the upper end portion of the front panel C23 so that a user can put his or her finger on the operating portion C231 in case of operating the head cap C to rotate. The head cap C of the above-mentioned arrangement is mounted rotatably around the rotational supporting axis C11 in a state of being tightly held between the second outside panel 11 and inside panel 12 by inserting the rotational supporting axis C11 into the through bores 11*a*, 120*a* formed on the extending portions 110, 120 of the second outside panel 11 and the inside panel 12 when the second outside panel 11 and the inside panel 12 are assembled.

Figure 6:
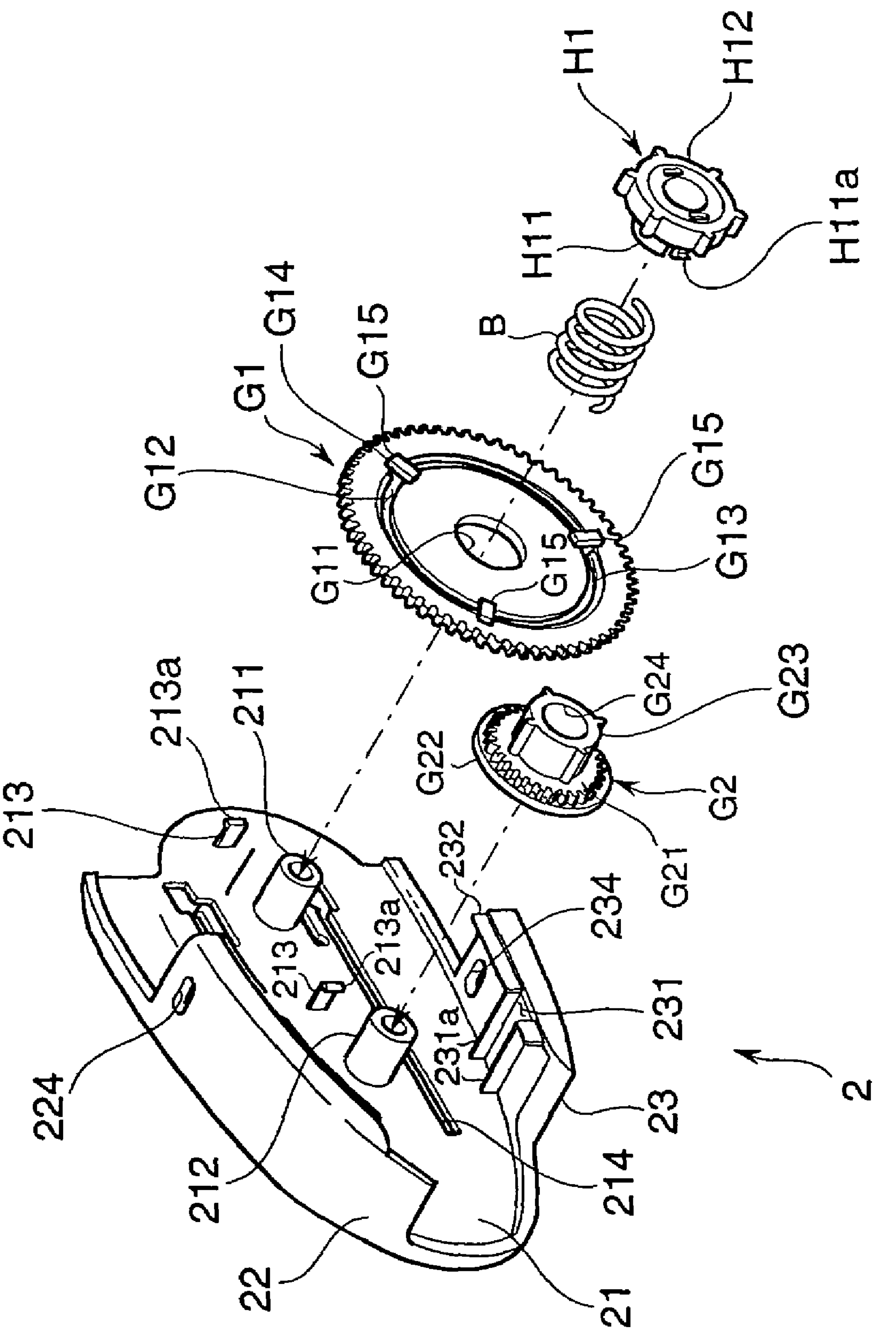
FIG. 6 is an exploded perspective view showing a case in accordance with the embodiment.
Figure 7:
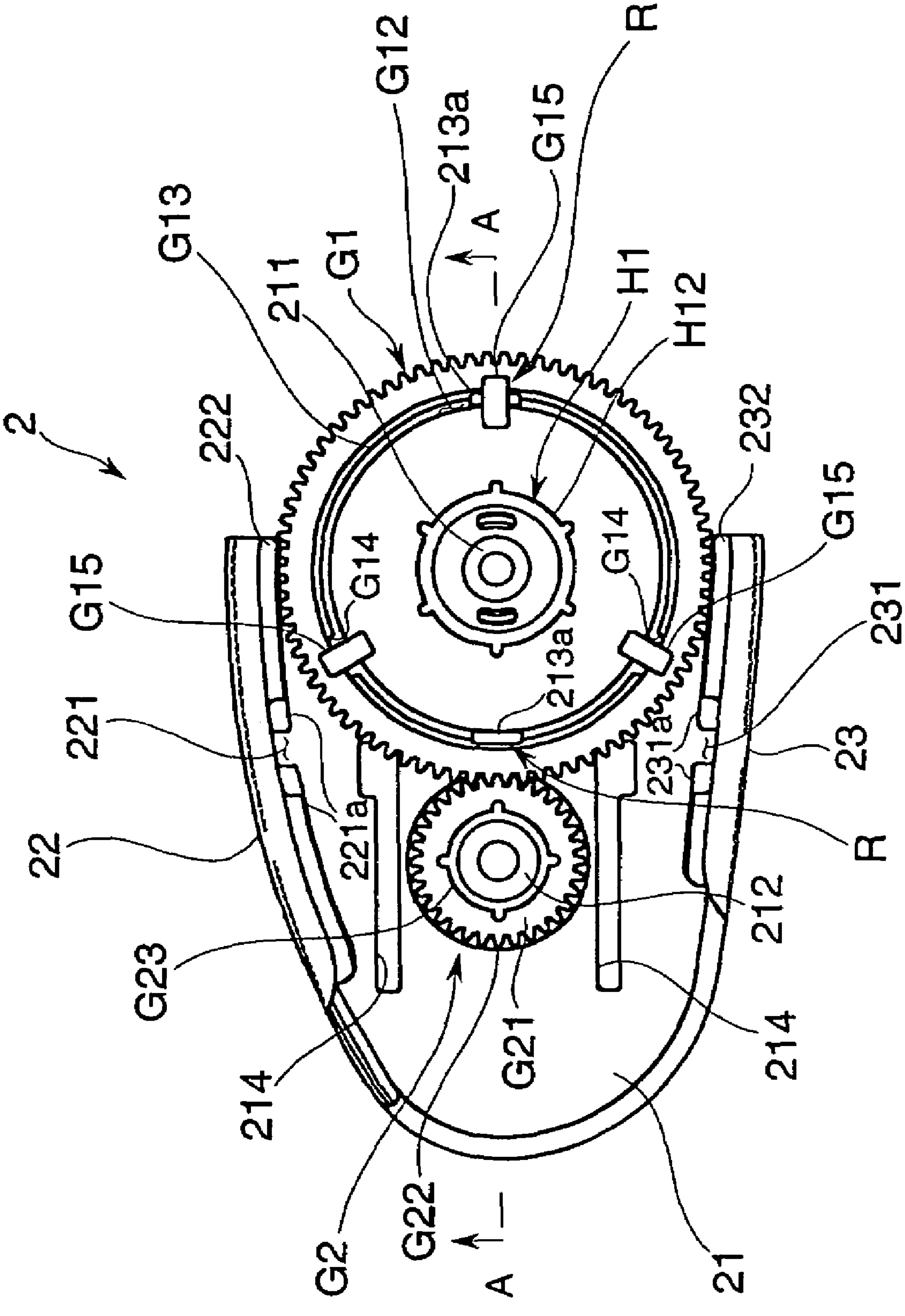
FIG. 7 is a side view of the case.
Figure 8:
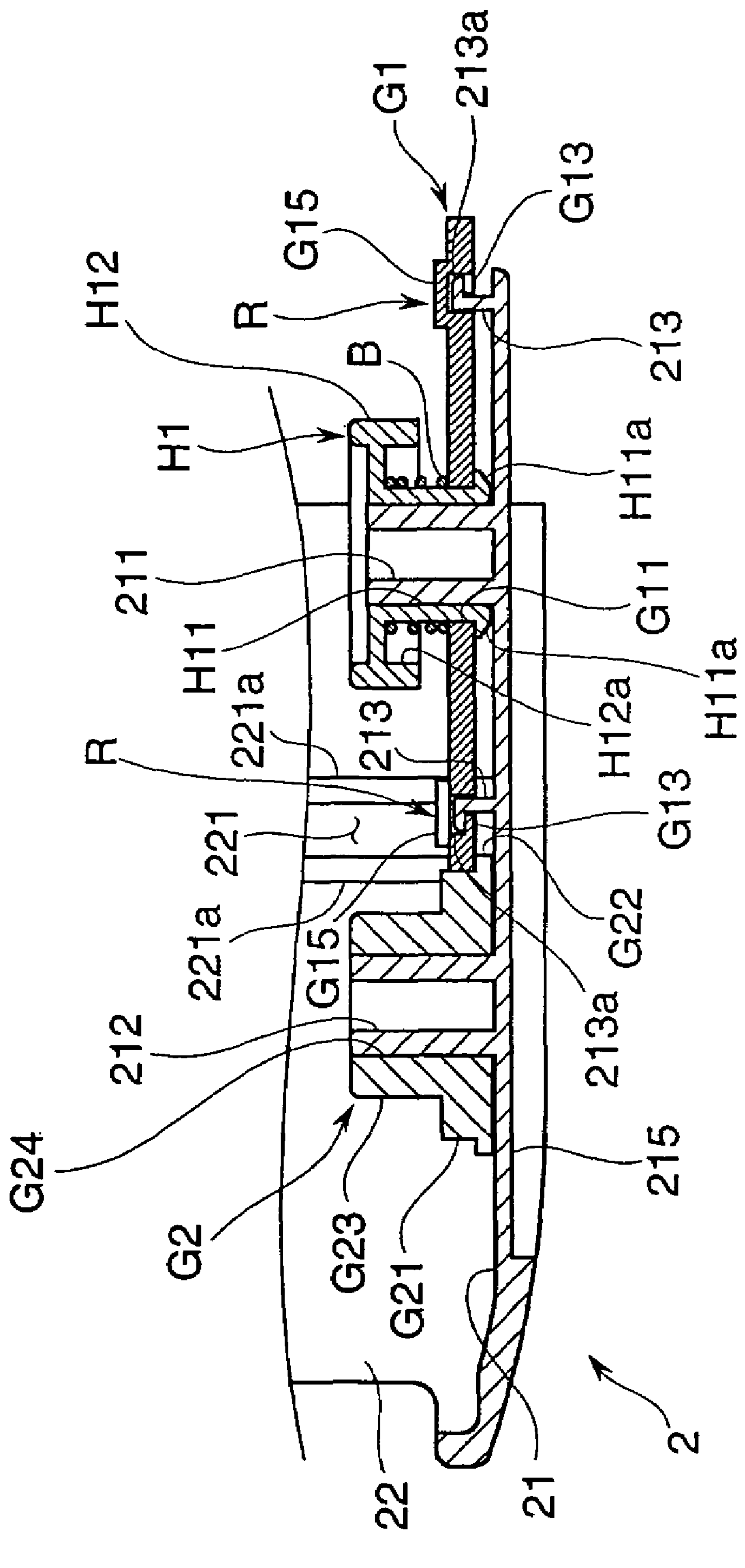
FIG. 8 is a cross-sectional view taken along a line A-A in FIG. 7 wherein a part is omitted to draw.

The case 2 mainly comprises integrally, as shown in FIG. 2, FIG. 6 and FIG. 8, a first outside panel 21 constituting an outside wall of the transfer device A in pairs with the second outside panel 11 and a pair of standing panels 22, 23 continuously arranged to an upper edge and a lower edge of the first outside panel 21 generally orthogonal to the first outside panel 21. Vertically arranged a pair of the standing panels 22, 23 are so set to generally close a space between the upper edge and the bottom edge of the second outside panel 11 in a state that the refillable cartridge 1 and the case 2 are assembled. The first outside panel 21 corresponds to "one of the side panels" among a pair of the side panels in the present claimed invention.

The first outside panel 21 is, like the second outside panel 11, for example, in a shape of a thin plate made of synthetic resin and is so arranged that a sliding member 3, to be described later, can be mounted on a rear end portion of the first outside panel 21, and in this embodiment, a side view in a state wherein the sliding member 3 is mounted on its rear end portion generally corresponds to a side view of the second outside panel 11 of the refillable cartridge 1. A wind-off gear G1 to drive to rotate the wind-off spool SP1 and the roll-up spool SP2 and a roll-up gear G2 that gears the wind-off gear G1 are arranged at an inside face of the first outside panel 21. In order to do so, rotary supporting axes 211, 212 that project toward the second outside panel 11 (the refillable cartridge 1) and each of which axially supports the wind-off gear G1 and the roll-up gear G2 are arranged at the inside face of the first outside panel 21. Each of the rotary supporting axes 211, 212 is generally in a cylindrical shape with its distal end portion opening toward the second outside panel 11 (the refillable cartridge 1). Next the wind-off gear G1 and the roll-up gear G2 will be explained. "The wind-off gear" corresponds to "one of the gears" among a pair of the gears in the present claimed invention and "the roll-up gear" corresponds to "the other gear" among a pair of the gears in the present claimed invention.

The wind-off gear G1 is so set to have a diameter larger than a diameter of the roll-up gear G2, as shown in FIG. 6 and FIG. 8, and has a serration continuously formed with an outer edge of the wind-off gear G1 and an insertion bore G11 at its center portion. A bore diameter of the insertion bore G11 is set to be one size larger than an external diameter of the rotational supporting axis 211 so that an inserting portion H11 of a core H1, as being a cylindrical portion of the present claimed invention to be described later, can be located between the insertion bore G11 and the rotational supporting axis 211. In addition, a slit G12 as being a concave portion of the present claimed invention is formed in an area a little inside of the outer edge of the wind-off gear G1. The slit G12 is a toric shape having a predetermined opening width and a center of the toric shape coincides with a center of the wind-off gear G1. Furthermore, a step portion G13 to project toward a direction to narrow the opening width of the slit G12 is arranged in the slit G12. More concretely, the step portion G13 is arranged along an outer circumferential face of the slit G12 and to project from the outer circumferential face of the slit G12 toward an inner circumferential face of the slit G12 by a predetermined height. The step portion G13 is so arranged to form a step in the slit G12 by making an outside face of the step portion G13 flat to an outside face of the wind-off gear G1 and a thickness of the step portion G13 thinner than a thickness of the wind-off gear G1 (refer to FIG. 8). Furthermore, a cutout G14 that penetrates the step portion G13 along a thickness of the step portion G13 is formed at a part of the step portion G13. In this embodiment, the cutout G14 is formed at equally spaced three portions. In addition, an arm portion G15 is arranged to bridge over the slit G12 on the inside face of the wind-off gear G1 so as to connect a portion inside of the inner circumferential face of the slit G12 with a portion outside of the outer circumferential face of the slit G12. The arm portion G15 is a shape of a thin plate and in this embodiment, the arm portion G15 is arranged at predetermined three portions corresponding to the portions where the cutout G14 is formed. In addition, the core H1 as being a cylindrical portion of the present claimed invention is mounted on the wind-off gear G1.

The core H1 comprises the inserting portion H11 that can be inserted into the insertion bore G11 of the wind-off gear G1 and a core body portion H12 that is arranged at the proximal end portion of the inserting portion H11 and that can fit into the inner circumferential face of the wind-off spool SP1, wherein the inserting portion H11 is integrally formed with the core body portion H12. The inserting portion H11 is generally in a cylindrical shape with its outer diameter set a little smaller than the opening width of the inserting bore G11 of the wind-off gear G1 and with its inner diameter set a little larger than the outer diameter of the rotational supporting axis 211. And slits are formed to face each other along an axial direction around a predetermined portion across an axial center of the inserting portion H11, the predetermined portion serves as an elastic portion that can make an elastic transformation, and an unciform engaging member H11*a* is integrally formed on a distal end portion of the elastic portion. The core body portion H12 has a diameter larger than a diameter of the inserting portion H11 and is so arranged that a concave groove H12*a* opening toward the outside face side (a distal end portion side of the inserting portion) is formed and the concave groove H12*a* can accommodate a spring B (refer to FIG. 8). The spring B is in a shape of a spring whose diameter is larger than a diameter of the inserting portion H11 and smaller than a diameter of the core body portion H12 and a longitudinal size of the spring B is set to be larger than a longitudinal size of the core H1.

In order to mount thus arranged core H1 on the wind-off gear G1, first, the inserting portion H11 of the core H1 is inserted into the insertion bore G11 of the wind-off gear G1 in a state that the spring B is accommodated in the concave groove H12*a* of the core body portion H12. In conjunction with this operation, the elastic portion of the inserting portion H11 is elastically transformed to approach each other and further operation to insert the core H1 will make the engaging member H11*a* climb over the insertion bore G11 of the wind-off gear G1, and the engaging member H11*a* makes an engagement with the outside face of the wind-off gear G1 when the elastic portion elastically restores itself (refer to FIG. 8). The spring B is located between the concave groove H12*a* of the core body H12 and the inside face of the wind-off gear G1 in a contracted state and the engaging nail H11*a* is urged toward a direction to engage with the outside face of the wind-off gear G1 by an urging force (a restoring force) of the spring G (refer to FIG. 8). As mentioned above, the wind-off gear G1 on which the core H1 is mounted in a state of being unable to detach is axially mounted on the rotational supporting axis 211 of the first outside panel 21. More concretely, the inserting portion H11 of the core H1 is fittingly inserted into the rotational supporting axis 211. And a restraining means R that restrains the wind-off gear G1 from being detached along the axial direction of the rotational supporting axis 211 is arranged between the wind-off gear G1 and the first outside panel 21. The restraining means R comprises the slit G12 formed on the wind-off gear G1 and the engaging portion 21 that is arranged on the first outside panel 21, that is inserted into the slit G12 of the wind-off gear G1 and that makes an engagement with the wind-off gear G1. The engaging portion 213 is so arranged to project from the inside face of the first outside panel 21 toward the second outside panel 11 (the refillable cartridge 1) and an engaging nail 213*a* that extends toward a direction to be separated from the rotational supporting axis 211 and that can make an engagement with the step portion G13 formed in the slit G12 is integrally formed at its distal end portion. In this embodiment, the engaging portion 213 is arranged in pairs across the rotational supporting axis 211 to face each other (refer to FIG. 6). When the inserting portion H11 fits over the rotational supporting axis 211 and then the engaging nail 213*a* is inserted into the slit G12 through the cutout G14 formed on the step portion G13 so as to engage with the step portion G13, the wind-off gear G1 makes an engagement with the first outside panel 21 and is positioned at a predetermined position, and then the wind-off gear G1 is restrained from moving toward a direction to which the wind-off gear is detached. "The direction to which the wind-off gear is detached" purports a direction to which the wind-off gear G1 is detached along an axial direction of the rotational supporting axis 211. As mentioned above, the wind-off gear G1 is mounted on the inside face of the outside panel 21 integrally and in a state of being incapable of dropping out. A projecting size of the engaging portion 213 is set appropriately so that the engaging portion 213 (the engaging nail 213*a*) does not interfere the arm portion G15 of the wind-off gear G1 while the wind-off gear G1 makes a rotational movement. In addition, an opening width along a circumferential direction of the cutout G14 formed on the step portion G13 is set to be a little smaller than a width of the engaging portion 213 (the engaging nail 213*a*) so that the engaging portion (the engaging nail 213*a*) inserted into the slit G12 through the cutout G14 is prevented from being dropped out from the cutout G14. Furthermore, while the cutout G14 is formed at equally spaced three portions, the engaging portion 213 is formed in pairs to face each other across the rotational supporting axis 211. As a result, while the wind-off gear G1 makes a rotational movement, since there is no chance that a pair of the engaging portions 213 are located at the portion where the cutout G14 is formed at the same time, the rotational movement of the wind-off gear G1 can be stabilized and an engaged state of the engaging portion 213 (the engaging nail 213*a*) and the step portion G13 will not be released.

The roll-up gear G2 comprises, as shown in FIG. 6 and FIG. 8, a gear body G21 that has serrations continuously formed with an outer edge of the gear body G21 and that gears the wind-off gear G1, a big diameter portion G22 whose diameter is set larger than a diameter of the gear body G21, and a core portion G23 as being a cylindrical portion of the present claimed invention that can fit into inner circumferential face of the roll-up spool SP2, wherein the gear body G21, the big diameter portion G21 and the core portion G23 are integrally formed. More concretely, the big diameter portion G21 is formed on the outside face of the gear body G21, and the core portion G23 is formed on the inside face of the gear body G21. Each center of the big diameter portion G21 is formed on the outside face of the gear body G21, and the core portion G23 is coincided, and a through bore G24 that can fit over the rotational supporting axis 212 of the first outside panel 21 is arranged at each center.

A procedure to mount the wind-off gear G1 and the roll-up gear G2 will be explained. First, the roll-up gear G2 is axially mounted on the rotational supporting axis 212. More concretely, the through bore G24 is fitted over the rotational supporting axis 212. As a result, the big diameter portion G22 of the roll-up gear G2 makes an abutting contact or is close to the inside face of the first outside panel 21 (Refer to FIG. 8). In this stage, since the through bore G24 fits just over the rotational supporting axis 212, the roll-up gear G2 is in a detachable state. Next, fittingly insert the inserting portion H11 of the core H11, integrally mounted on the wind-off gear G1 with the above procedure, over the rotational supporting axis 211 and insert the engaging portion 213 into the slit G12 through the cutout G14 so that the engaging nail 213*a* makes an engagement with the step portion G13. With the above procedure, the wind-off gear G1 is axially supported by the rotational supporting axis 211 so that the wind-off gear G1 is mounted on the inside face of the first outside panel 21 in a manner of being unable to detach. In conjunction with the above procedure, the engaging member H11*a* arranged on the inserting portion H11 of the core H1 makes an abutting contact with or is close to the inside face of the first outside panel 21, and the big diameter G22 of the roll-up gear G2 is located between the wind-off gear G1 and the first outside panel 21 at a portion where the wind-off gear G1 gears with the roll-up gear G2 (Refer to FIG. 8). As a result, the roll-up gear G2 is restricted from moving toward an axial direction of the rotational supporting axis so that the roll-up gear G2 is prevented from being pulled out from the rotational supporting axis 212. In this case, the wind-off gear G1 functions as a stopper to prevent the roll-up gear G2 from moving toward a direction of being pulled out. "A direction of being pulled out of the roll-up gear G2" corresponds to a direction to which the roll-up gear G2 is pulled out along the axial direction of the rotational supporting axis 212. With the above-mentioned procedure, the wind-off gear G1 and the roll-up gear G2 are mounted on the inside face of the outside panel 21 in a manner of being unable to detach. A periphery of the core H1 gears an inner circumference of the wind-off spool SP1 and a periphery of the core H2 gears an inner circumference of the roll-up spool SP2 when the case 2 fits over the refillable cartridge 1.

The slits 214, each of which extends back and forth, are arranged vertically in pairs at a center portion of the first outside panel 21 and the sliding member 3, to be described later, is mounted in a manner of sliding movable along back and forth by making use of these slits 214.

Each of the standing panels 22, 23 has a predetermined thickness respectively and is integrally provided with grooves 221, 231 into which the projecting portions 125*a*, 125*b* arranged on the inside panel 12 of the refillable cartridge 1 can fit, and abutting members 222, 232 with which a peripheral portion of the inside face of the second outside panel 11 can make an abutting contact. The grooves 221, 231 are formed between a pair of ribs 221, and between a pair of ribs 231 each of which is arranged along a standing direction of the standing panel 22, 23, respectively, at predetermined portions corresponding to portions where the projecting portions 125*a*, 125*b* are arranged. Each groove 221, 23*a* is an opening edge whose one end portion opens toward the refillable cartridge 1 and is so arranged that the projecting portions 125*a*, 125*b* of the refillable cartridge 1 can be mounted or dismounted by making use of the opening edge. Each abutting member 222, 232 is formed at a distal end portion of the standing panel 22, 23 to project a little toward the other standing panel 23, 22 generally parallel to the first outside panel 21. Each abutting member 222, 232 is arranged neither between the ribs 221*a*, nor between the ribs 231*a*. An opening edge of each abutting members 222, 232 opens toward the refillable cartridge 1. The abutting member 222, 232 is thin-walled so as to make the outside face of the standing panel 22, 23 and the outside face of the second outside panel 11 generally flat when the refillable cartridge 1 fits into the case 2.

The sliding member 3 that can be mounted on the case 2 is, as shown in FIG. 1 and FIG. 2, in a shape of an "L" character of synthetic resin comprising a side panel 31 that makes a sliding movement along a pair of vertically arranged slits 214 formed on the first outside panel 21, namely along a direction of back and forth of the first outside panel 21, and that is arranged along an outside face of the first outside panel 21, and an integrally formed operating panel 32 that is integrally formed with the side panel 31 and that is arranged to cover generally whole area of the rear end portion side of the case 2. In a state that the sliding member 3 is mounted on the case 2, a concave portion 215 to be dented is formed at a predetermined area around the slit 214 on the outside face of the first outside panel 21 to correspond to a shape of the side panel 31 so that an outside face of the side panel 31 is to be flat to the outside face of the first outside panel 21 (Refer to FIG. 8). The rotary supporting axes 211, 212 are arranged on the inside face of the area where the concave portion 215 is formed. In addition, the operating panel 32 is generally in a shape of a partial ark in a side view and bent along a shape of the rear end portion of the standing panel 22, 23 of the case 2. The fitting bore 321, into which the fitting nail 112 arranged at the rear end portion of the second outside panel 11 of the refillable cartridge 1 fits, is formed at a center portion of the inside face of the operating panel 32 and a pair of operating portions 322 are formed at both end portions on the outside face of the operating panel 32. In addition, an unciform engaging member 323 is formed at one end portion of each operating panel 32 to project forward. At the rear end portion of the standing panel 22, 23 the case 2 has engaging bores 224, 234 that can make an engagement with the engaging member 323 in order to correspond to the sliding member 3 of the above arrangement. An engaging means is constituted by a pair of the engaging members 323, 323 and the engaging bores 224, 234 corresponding to the engaging members 323, 323. The sliding member 3 is stably held by the case 2 at a position where a sliding movement starts by engaging the engaging members 323, 323 with the engaging bores 224, 234 respectively. In accordance with the above-mentioned arrangement, the sliding member 3 is closely related to the refillable cartridge 1 due to a fitting arrangement of the fitting bore 321 and the fitting nail 112 and engages with the case 2 due to an engaging arrangement of the engaging member 323, 323 and the engaging bores 224, 234 in a state that the sliding member 3 is mounted on the case 2 and that the refillable cartridge 1 is assembled with the case 2.

When the transfer device A is slid toward a predetermined direction with contacting a surface of a paper or the like, the transferring paste T held between the distal end portion Ka of the transfer head K and the surface of the paper is sent out from the wind-off spool SP1 that rotates together with the wind-off gear G1 due to frictional force and the paste adhered to one face of the tape body Ta is transferred on the surface of the paper. At the same time, the roll-up spool SP2 rotates together with the roll-up gear G2 that rotates to a counter direction in conjunction with the wind-off gear G1, and the tape body Ta that does not have paste on its face is rolled up by the roll-up spool SP1. If an appropriate tool or a writing material that has a spiculate portion at its distal end such as a driver or a pen is inserted into a chamfer, not shown in drawings, arranged intermittently along a circumference of the outside face of the roll-up spool SP1, and then the roll-up spool SP1 is rotated by the use of the appropriate tool or the writing material, a slack of the transferring paste T in the transfer device A can be adjusted due to a rotation of the wind-off spool SP2 in conjunction with the rotation of the roll-up spool SP1.

Figure 9:
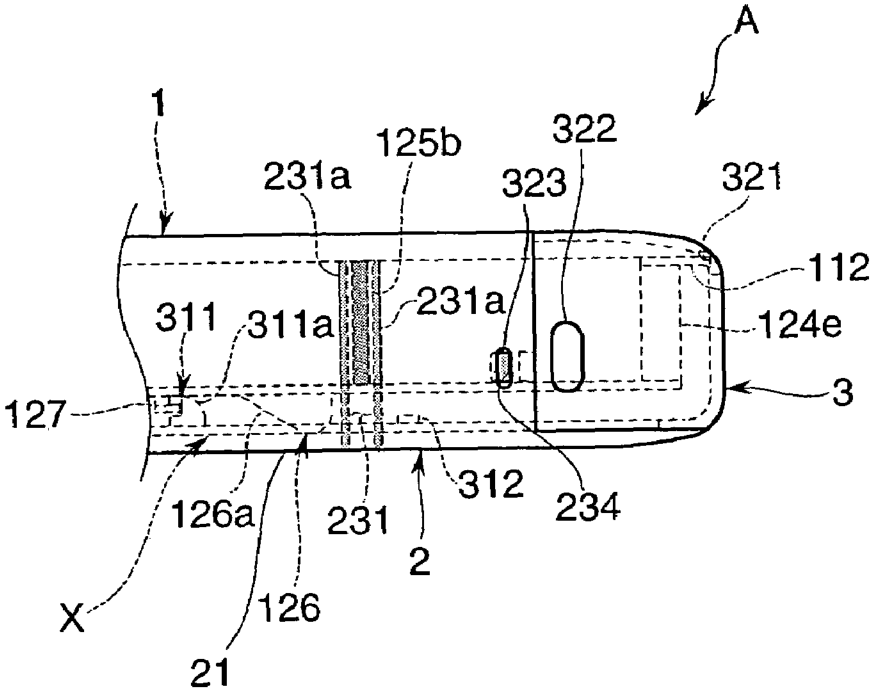
FIG. 9(*a*) is an explanatory view of an operation of one embodiment of the present invention.
Figure 9:
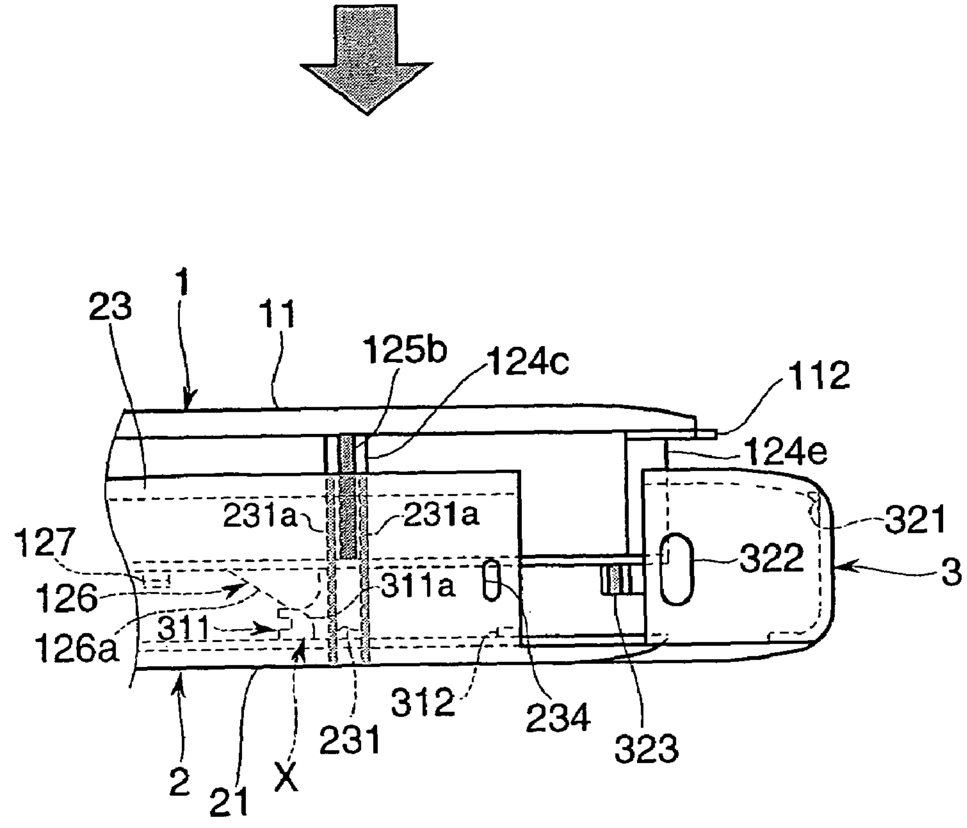

The transfer device A is so arranged that the refillable cartridge 1 and the case 2 can be separated by sliding the sliding member 3 back and force relative to the case 2, and a separating mechanism X is formed by making the refillable cartridge 1, the case 2 and the sliding member 3 mutually related. The separating mechanism X comprises a pair of projecting portions 311, 311 vertically arranged on an inside face of the side panel 31 so as to be inserted into the slits 214 vertically arranged on the case 2, and a pair of separation initiating portions 126, 126 vertically arranged on the inside panel 12 of the refillable cartridge 1 to face the case 2. Each of the separation initiating portions 126 is in a shape of a thin plate with forming a tapered face 126*a* inclining toward the front. Each of the separation initiating portion 126 is inserted into the slit 214 as being a traveling path of the projecting portion 311 so as to be in ready. Each of the projecting portion 311 is in an unciform shape of a thin plate with forming a tapered face 311*a* inclining toward the rear. In order to avoid the sliding member 3 from dropping out in conjunction with a sliding movement of the sliding member 3, a pair of small projecting portions 312, 312 are formed vertically on the sliding member 3 to be inserted into the slits 214 at a position rearward to the projecting portion 311 so as to make an abutting contact with a stopper portion, not shown in drawings, formed on the slit 214 when the sliding member 3 is slid rearward by a predetermined distance (at a sliding end position). As the stopper portion, an arrangement may be such that an opening width of the slit 214 is set to be narrow so that the small projecting portion 311 makes an abutting contact or that an opening edge of the slit 214 is utilized. A procedure to separate the refillable cartridge 1 from the case 2 by making use of the separating mechanism X will be explained with reference to FIG. 9. FIG. 9 is a magnified plane view of a principal part with some part omitted to draw. First, in a state that the refillable cartridge 1 and the case 2 are assembled (refer to FIG. 9(*a*)), the standing panels 22, 23 of the case 2 are held with one hand and the sliding member 3 located at the sliding start position is slid rearward relative to the case 2 with pushing a pair of the operating portions 322, 322 arranged on the sliding member 3 to approach each other with the other hand. In conjunction with this operation, an engaged state of the engaging member 323 and the engaging bore 224, 234 (an engaged state by the engaging means) and an engaged state of the fitting nail 112 and the fitting bore 321 are released respectively, and then the projecting portion 311 of the sliding member 3 starts to interfere the separation initiating portion 126 arranged on the inside panel 12 of the refillable cartridge 1. Additional movement to slide the sliding member 3 rearward makes the tapered face 311*a* of the projecting portion 31 abutting contact with the tapered face 126*a* of the separation initiating portion 126 and the sliding member 3 climbs over the inside panel 12 of the refillable cartridge 1 little by little (refer to FIG. 9(*b*)). In this case, a pair of the projecting portions 125*a*, 125*b* arranged on the inside panel 12 are guided by the grooves 221, 231 formed on the standing panels 22, 23 of the case 2 so that the refillable cartridge 1 is gradually separated from the case 2 toward a direction orthogonal to the direction of sliding the sliding member 3 in a generally linear manner. When the sliding member 3 reaches the sliding end position by further making a sliding movement rearward by a predetermined distance, the small projecting portion 312 of the sliding member 3 makes an abutting contact with a stopper portion, not shown in drawings, formed in the slit 214, which restrains the sliding member 3 from further making a sliding movement. In this state, the refillable cartridge 1 and the case 2 can be separated by moving the refillable cartridge 1 along a direction generally orthogonal to the direction of sliding the sliding member 3. In order to mount a new refillable cartridge 1 on the case 2, all needed is just to move the new refillable cartridge 1 to gradually approach the case 2 with the projecting portion 125*a*, 125*b* of the new refillable cartridge 1 guided by the grooves 221, 231 formed on the standing panels 22, 23 of the case 2. The wind-off gear G1 and the roll-up gear G2 will never be detached from the case 2 because the wind-off gear G1 and the roll-up gear G2 are mounted on the inside face of the first outside panel 21 in a manner of being incapable of dropping out even though the case 2 is flipped horizontally or vertically while the refillable cartridge 1 is exchanged.

As mentioned above, since the transfer device A is so arranged that the restraining means R that restrains the wind-off gear G1 from being pulled out along the axial direction of the rotational supporting axis 211 in a state that the wind-off gear G1 is axially supported by the rotational supporting axis 211 is arranged between the first outside panel 21 and the wind-off gear G1 and furthermore at a position different from a portion where the wind-off gear G1 and the rotational supporting axis are axially mounted, the restraining means R can prevent the wind-off gear G1 from being pulled out from the first outside panel 21. In addition, since the restraining means R is arranged at a position different from an axially supported portion (a rotational center portion of the wind-off gear G1), rotational blurring of the wind-off gear G1 that tends to be generated at a portion separated from the rotational center can also be prevented. Furthermore, since the rotational supporting axis 211 and the wind-off gear G1 are assembled by just inserting the inserting portion H11 of the core H1 over the rotational supporting axis 211, it is possible to set the outside diameter of the rotational supporting axis 211 and the inside diameter of the inserting portion H11 arbitrary to hardly generate clearance between the rotational supporting axis 211 and the inserting portion H11 and to restrain rotational blurring that might occur at the axially supported portion. In addition, since no component such as an engaging nail or the like exists at the axially supported portion of the wind-off gear G1 and the rotational supporting axis 211, a state of sliding the wind-off gear G1 and the rotational supporting axis 211 can be further improved.

Especially, since the restraining means R can position the wind-off gear G1 at the predetermined mounting position by mutually engaging the area near the outer edge portion of the wind-off gear G1 and the first outside panel 21, it is possible stabilize a state that the wind-off gear G1 and the first outside panel 21 are axially supported, thereby enabling to restrain rotational blurring that tends to be generated at the outside edge portion of the wind-off gear G1.

In addition, since the restraining means R comprises the toric concave portion G12 that is formed on the wind-off gear G1 and that has the predetermined opening width, and the engaging portion 213 that is formed on the first outside panel 21 and that is inserted into the slit G12 and engages with the wind-off gear G1 in a range that does not disturb a rotational movement of the wind-off gear G1, it is possible to make the restraining means R with a simple arrangement. In addition, since the slit G12 is in a toric shape, a smooth rotational movement of the wind-off gear will not be disturbed by the restraining means R.

Since the step portion G13 that projects toward a direction where the opening width of the slit G12 is narrowed is arranged inside the slit G12 and the engaging nail 213*a* that can make an engagement with the step portion G13 is arranged on the engaging portion, a state of engaging the slit G12 and the engaging portion 213 can be improved by hooking the engaging nail 213*a* with the step portion G13.

In addition, since the step portion G13 is arranged generally in an arc shape along the outer circumferential face of the slit G12, the cutout G14 is formed at a part of the step portion G13, and the engaging nail 213*a* is inserted into the slit G12 and engages with the step portion G13 through the cutout G14, it is possible to operate the engaging nail 213*a* with the step portion G13 smoothly and accurately.

In addition, since the arm portion G15 is arranged at the portion to bridge the slit G12 on the wind-off gear G12, the wind-off gear G12 will not be separated into two components by the slit G12.

Furthermore, since the engaging portion 213 is arranged in a pair on the first outside panel 21, it is possible to stabilize a state (a state that the restraining means R is engaged) that the wind-off gear G1 is mounted, thereby enabling to effectively prevent the wind-off gear G1 from moving toward a direction to be pulled out and from rotational blurring.

Especially, since the restraining means R is arranged only between the wind-off gear G1 and the first outside panel 21, and the big diameter portion G22 of the roll-up gear G2 is located between the wind-off gear G1 and the first outside panel 21, the number of components can be reduced and a manufacturing process can be simplified compared with a conventional arrangement wherein the restraining means R is mounted in association with both gears G1, G2. In addition, since the big diameter portion G22 of the roll-up gear G2 is located between the wind-off gear G1 and the first outside panel 21, each of which is mutually engaged by the restraining means R, it is also possible to prevent the roll-up gear G2 from moving toward a direction to be pulled out at once. Especially, since the gear body G21 and the big diameter portion G22 are integrally formed, a number of component and a cost can be reduced.

In addition, since the transfer device A has the core H1 and the core portions G23, each of which rotates together with the wind-off gear G1 and the roll-up gear G2, fits over the rotational supporting axis 211, 212 rotatably, and engages with the wind-off spool SP1 and the roll-up spool SP1 respectively, the axially mounted portion of the wind-off gear G1 and the rotational supporting axis 211 and the axially mounted portion of the roll-up gear G2 and the rotational supporting axis 212 can be strengthened. Furthermore, since the core portion G23 is integrally mounted on the roll-up gear G2, the number of components can be reduced.

Since the first outside panel 21 wherein the rotational supporting axis 211, 212 axially supports the wind-off gear G1 and the roll-up gear G2 constitutes the case 2 and the wind-off gear G1 and the roll-up gear G2 are mounted on the case in a state of being incapable of detached, the wind-off gear G1 and the roll-up gear G2 will not drop even though the case 2 is placed upside down while the refillable cartridge 1 is exchanged, thereby to be superior in usability.

The present claimed invention is not limited to the above-described embodiments.

Figure 10:
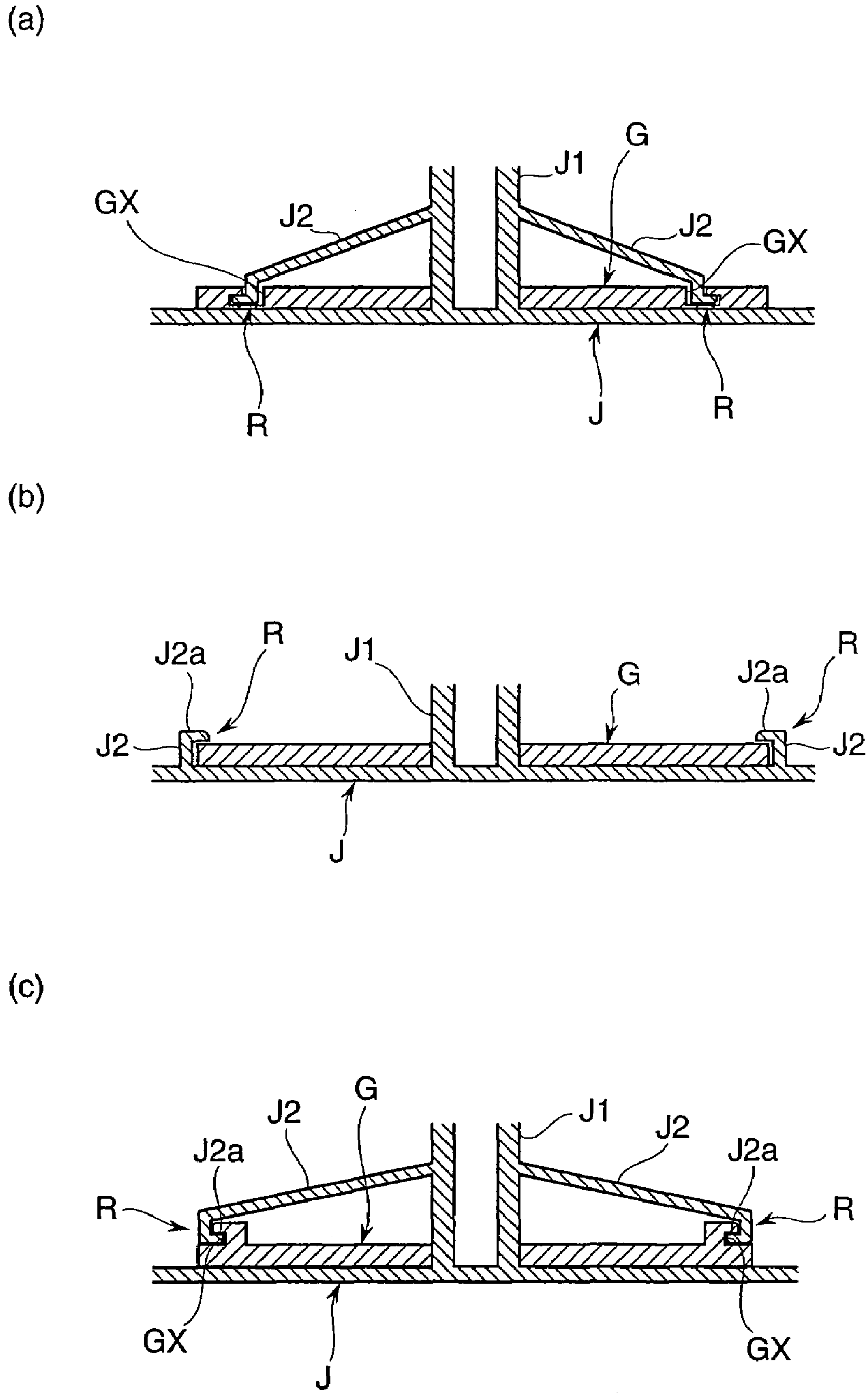
FIG. 10(*a*) is a view showing a modified form of a restraining means in accordance with one embodiment of the invention.

For example, as shown in FIG. 10(*a*), the restraining means R may be arranged between a gear G and a rotational supporting axis J1 and at a portion different from a portion where the gear G and the rotational supporting axis J1 are axially mounted. In accordance with this arrangement, it is possible to prevent the gear G from being detached from the side panel J and to prevent the gear G from blurring at a portion separated from the rotational center of the gear G due to the restraining means R. "The side panel J" in FIG. 10 corresponds to the first outside panel 21 in the above-mentioned embodiment and "the rotational supporting axis J1" corresponds to the rotational supporting axis 211 (212) in the above-mentioned embodiment. In the arrangement shown in FIG. 10, an engaging portion J2 that engages with a concave portion GX formed on the gear G is integrally formed with the rotational supporting axis J1, however, the engaging portion may be integrally mounted on the rotational supporting axis J1. In this arrangement, the concave portion GX is a groove having a bottom, however, the concave portion GX may be a slit or, so called, a depression that is dented from its surrounding area.

In addition, the restraining means may be arranged between one of the gears and one of the side panels or the rotational supporting axis and also between the other gear and the other side panel or the rotational supporting axis, and the other gear and the side panel or the rotational supporting axis are engaged by the restraining means so that the other gear is positioned at a predetermined mounting position. In this case, the other gear does not require a member between the gear and the side panel. In accordance with this arrangement, it is also possible to prevent each gear from being dropped off from the side panel.

In addition, the restraining means is not limited to the above-mentioned arrangement wherein a portion near the outer edge portion of the gear and the side panel are mutually engaged, however, the restraining means may have an arrangement wherein a portion locating at an outer edge side from a center between a center portion of the gear and the outer edge of the gear, and one of the side panels or the rotational supporting axis are mutually engaged as far as the gear can be positioned at the predetermined mounting position. In accordance with this arrangement, since the portion separated from the rotational center of the gear makes an engagement with one side panel or the rotational supporting axis, the axially mounted state of the gear and the side panel can be stabilized, thereby enabling to prevent rotational blurring that tends to be generated at the portion separated from the rotational center portion of the gear.

In addition, the step portion may be arranged along an inner face of the concave portion. In this case, if the engaging nail is arranged to project inward toward the axially mounted portion, it is possible to engage the engaging nail with the step portion.

Furthermore, the arm portion is to connect the inside area of the inner circumferential face of the concave portion and the outside area of the outer circumferential face of the concave portion, and the arm portion may be arranged to connect, for example, the rotational supporting axis as a portion of the inside of the concave and the area adjacent the outer edge portion of the gear as being a portion of the outside of the concave portion. Furthermore, in case that the concave portion is a groove or dent having a bottom, the arm portion functions as a rib to reinforce the groove or the dent as being a portion of a thin wall, thereby enabling to effectively increase the strength of the gear.

The restraining member may comprise an engaging portion that is arranged on one of the side panels and that engages with a part of the gear in a range wherein a rotational movement of the gear is not interfered. As one example, it is represented that an engaging portion J2 that can engage with the gear G from an outer edge side of the gear G is arranged on one side panel J as shown in FIG. 10(*b*). More concretely, an engaging nail J2*a* that can engage with a portion located at a part of the gear G and facing the other side panel wherein the gear G is not mounted is arranged on the engaging portion J2. In accordance with this arrangement, there is no need of arranging the concave portion on the gear G, thereby simplifying the arrangement. In case of adopting the restraining means R, it is preferable that the engaging portion J2 is arranged at a position separated from a portion where the gears G are engaged in order not to interfere the engaged state of the gears G. In addition, the restraining means may comprise an engaging portion that is arranged on the rotational supporting axis and that engages with a part of the gear in a range wherein the rotational movement of the gear is not interfered. As one example, it is represented that the engaging portion J2 that can engage with the gear G from the outer side face3 of the gear G is arranged on the rotational supporting axis J1, as shown in FIG. 10(*c*). More concretely, an engaging nail J2*a* that can engage with a portion located at a part of the gear G and facing the other side panel wherein the gear G is not mounted is arranged on the engaging portion J2. In FIG. 10(*c*), the engaging portion J2 that engages with the gear G is integrally formed with the rotational supporting axis J1, however, it may be a type wherein the engaging portion is integrally mounted on the rotational supporting axis J1. In addition, the engaged portion GX that engages with the engaging portion J2 is arranged at the portion located on the gear G and facing the other side panel, however, a shape of the engaged portion GX is not limited to this and may be any shape as far as the engaging portion J2 can make an engagement with the engaged portion GX. FIG. 10 is a pattern diagram showing a relationship between the gear and the side panel and a cylindrical portion (a core) of this invention is omitted to draw.

In addition, the engaging portion may be one or may be increased or decreased arbitrary.

Furthermore, the big diameter portion of the other gear located between the gear and the side panel may be other member integrally mounted on the other gear. In addition, in a state that the gear is axially supported by the rotational supporting axis, a covering portion that can cover a part of the other gear from a side of the other side panel may be arranged on the gear so as to locate a part of the gear between the side panel and the covering portion. In this case, the covering portion serves as a stopper restraining the other gear from moving toward a direction to be pulled out.

In the above embodiment, the transfer device A comprising the refillable cartridge 1 and the case 2 is explained, however, a transfer device may be expendable. In this case, a pair of the side panels constituting the outside wall of the transfer device correspond to "a pair of the side panels".

The transfer paste as the transferring material may be solid or liquid, and can be applied to a correction tape, an adhesive tape, a tape that does not have adhesiveness, a binding material, and a general transferring material to be transferred to an object on which the transferring material is to be transferred.

Other concrete arrangement is not limited to the above embodiments and may be variously modified without departing from the spirit of the invention.

As mentioned above, in accordance with the transfer device of the present claimed invention, the restraining means can improve an axially mounted state of the gear and the rotational supporting axis and it is possible to prevent the gear from being pulled out from the side panels surely. In addition, since the restraining means is arranged at the portion where the gear and the rotational supporting axis are axially mounted, namely, the portion different from the rotational center of the gear, it is possible to prevent the gear from rotational blurring that tends to be generated at the portion wherein the gear is mounted on the rotational supporting axis. Furthermore, since a clearance between the rotational supporting axis and the gear can be set extremely small, rotational blurring of the gear which might be generated at a portion where the gear is axially mounted can be prevented, resulting in also preventing rotational blurring of the gear which might be generated at the portion separated from the portion where the gear is axially mounted more certainly. Furthermore, since no engaging nail is arranged at the portion where the gear is axially mounted on the rotational supporting axis, it is possible to simplify the arrangement of the rotational supporting axis and also possible to improve a sliding state between the rotational supporting axis and the gear.

The invention claimed is:

1. A transfer device used for transferring a transferring material on an object on which the transferring material is to be transferred, comprising a pair of side panels that hold the transferring material, a pair of spools that are supported rotatably by a pair of the side panels and that hold the transferring material, and a pair of gears that drive a pair of the spools to rotate and that gear each other, and on either one of the side panels, a rotational supporting axis that projects toward the other side panel and that axially supports the gear is arranged, and characterized by that a restraining means that restrains the gear from being pulled out along an axial direction of the rotational supporting axis in a state that the gear is axially supported on the rotational supporting axis is arranged between one of the side panels or the rotational supporting axis and the gear and furthermore at a portion different from a portion where the gear is axially mounted on the rotational supporting axis; wherein the restraining means can position the gear at a predetermined mounting position by mutually engaging a portion locating at an outer edge side from a center between a center portion of the gear and the outer edge of the gear, and the side panel, or the rotational supporting axis.

2. The transfer device described in claim 1, wherein the restraining means comprises an engaging portion that is arranged on the side panel or the rotational supporting axis and that makes an engagement with one part of the gear in a range that does not disturb a rotational movement of the gear.

3. The transfer device described in claim 2, wherein an engaging nail that can make an engagement with a portion of the gear facing the other side panel on which the gear is not mounted is arranged on the engaging portion.

4. The transfer device described in claim 1, wherein the restraining means is arranged only between one of a pair of the gears and the side panel or the rotational supporting axis and a part of the other gear is positioned between the gear and the side panel.

5. The transfer device described in claim 4, wherein the above-mentioned other gear has a gear body that gears with the gear, and a big diameter portion whose diameter is set to be larger than a diameter of the gear body, and the big diameter portion is arranged between the gear and the side panel.

6. The transfer device described in claim 5, wherein the gear body and the big diameter portion are integrally formed.

7. The transfer device described in claim 1, wherein a cylindrical portion that rotates together with the gear, that fits over the rotational supporting axis rotatably, and that engages with the spool is arranged at a portion where the gear is axially mounted on the rotational supporting axis.

8. The transfer device described in claim 7, wherein the cylindrical portion is integrally formed with the gear.

9. The transfer device described in claim 1, and comprising a refillable cartridge that holds at least the transferring material and the spool, and a case that accommodates the refillable cartridge detachably, wherein the side panel on which the gear is axially mounted through the rotational supporting axis is a component constituting the case.

10. A transfer device used for transferring a transferring material on an object on which the transferring material is to be transferred, comprising a pair of side panels that hold the transferring material, a pair of spools that are supported rotatably by a pair of the side panels and that hold the transferring material, and a pair of gears that drive a pair of the spools to rotate and that gear each other, and on either one of the side panels, a rotational supporting axis that projects toward the other side panel and that axially supports the gear is arranged, and characterized by that a restraining means that restrains the gear from being pulled out along an axial direction of the rotational supporting axis in a state that the gear is axially supported on the rotational supporting axis is arranged between one of the side panels or the rotational supporting axis and the gear and furthermore at a portion different from a portion where the gear is axially mounted on the rotational supporting axis, wherein the restraining means comprises a generally toric concave portion that is formed on the gear and that has a predetermined opening width, and an engaging portion that is formed on the side panel or the rotational supporting axis and that is inserted into the concave portion and engages with the gear in a range that does not disturb a rotational movement of the gear.

11. The transfer device described in claim 10, wherein a step portion that projects toward a direction where the opening width of the concave portion is narrowed is arranged inside the concave portion, and an engaging nail that can make an engagement with the step portion is arranged on the engaging portion.

12. The transfer device described in claim 11, wherein the step portion is arranged generally in an arc shape along an inner circumferential face or an outer circumferential face of the concave portion, a cutout is formed at a part of the step portion, and the engaging nail is inserted into the concave portion through the cutout and engages with the step portion.

13. The transfer device described in claim 10, wherein an arm portion that connects a portion located inside of the concave portion and a portion located outside of the concave portion is arranged on the gear.

14. The transfer device described in claim 10, wherein the concave portion is a slit formed to penetrate the gear along a direction of a wall thickness of the gear.

15. The transfer device described in claim 10, wherein multiple engaging portions are arranged on the side panel or the rotational supporting axis.

16. The transfer device described in claim 10, wherein a cylindrical portion that rotates together with the gear, that fits over the rotational supporting axis rotatably, and that engages with the spool is arranged at a portion where the gear is axially mounted on the rotational supporting axis.

17. The transfer device described in claim 16, wherein the cylindrical portion is integrally formed with the gear.

18. The transfer device described in claim 10, wherein the restraining means is arranged only between one of a pair of the gears and the side panel or the rotational supporting axis and a part of the other gear is positioned between the gear and the side panel.

19. The transfer device described in claim 18, wherein the above-mentioned other gear has a gear body that gears with the gear, and a big diameter portion whose diameter is set to be larger than a diameter of the gear body, and the big diameter portion is arranged between the gear and the side panel.

20. The transfer device described in claim 19, wherein the gear body and the big diameter portion are integrally formed.

21. The transfer device described in claim 10, and comprising a refillable cartridge that holds at least the transferring material and the spool, and a case that accommodates the refillable cartridge detachably, wherein the side panel on which the gear is axially mounted through the rotational supporting axis is a component constituting the case.

* * * * *